(12) United States Patent
Zuardy et al.

(10) Patent No.: US 8,882,469 B2
(45) Date of Patent: Nov. 11, 2014

(54) STRUCTURAL ELEMENT FOR AN AIRCRAFT OR SPACECRAFT AND METHOD FOR PRODUCING SUCH A STRUCTURAL ELEMENT

(75) Inventors: Ichwan Zuardy, Hamburg (DE); Karim Grase, Hamburg (DE); Wolfgang Voege, Bremen (DE); Axel Herrmann, Stade (DE)

(73) Assignee: Airbus Operations GmbH, Hamburg (DE)

( * ) Notice: Subject to any disclaimer, the term of this patent is extended or adjusted under 35 U.S.C. 154(b) by 661 days.

(21) Appl. No.: 13/189,743

(22) Filed: Jul. 25, 2011

(65) Prior Publication Data

US 2012/0020801 A1 Jan. 26, 2012

Related U.S. Application Data

(60) Provisional application No. 61/367,560, filed on Jul. 26, 2010.

(51) Int. Cl.
| | |
|---|---|
| *B64C 3/18* | (2006.01) |
| *B64C 3/20* | (2006.01) |
| *B64C 11/26* | (2006.01) |
| B64C 27/473 | (2006.01) |
| B64C 1/00 | (2006.01) |

(52) U.S. Cl.
CPC ........... *B64C 3/20* (2013.01); *B64C 2027/4736* (2013.01); *B64C 11/26* (2013.01); *B64C 27/473* (2013.01); *Y02T 50/433* (2013.01); *B64C 2001/0072* (2013.01); *Y02T 50/43* (2013.01); *Y10S 416/50* (2013.01)
USPC ......... 416/226; 416/230; 416/241 R; 416/500

(58) Field of Classification Search
CPC ...... B64C 3/185; B64C 11/18; B64C 27/467; B64C 27/51

USPC .............................. 416/226, 230, 241 R, 500
See application file for complete search history.

(56) References Cited

U.S. PATENT DOCUMENTS

| | | | |
|---|---|---|---|
| 3,323,597 A | | 6/1967 | Longobardi et al. |
| 3,566,493 A | * | 3/1971 | Poucher et al. ............ 29/889.71 |

(Continued)

FOREIGN PATENT DOCUMENTS

| | | |
|---|---|---|
| CN | 101357516 | 2/2009 |
| CN | 101649818 | 2/2010 |

(Continued)

OTHER PUBLICATIONS

German Search Report, Jun. 24, 2013.

(Continued)

*Primary Examiner* — Ninh H Nguyen
(74) *Attorney, Agent, or Firm* — Greer, Burns & Crain Ltd.

(57) ABSTRACT

The present invention provides a structural element, in particular for an aircraft or spacecraft, comprising a core, the material density of which varies, at least in portions, in order to optimize the natural vibration behavior of the structural element. The present invention further provides a method for producing a structural element, in particular for an aircraft or spacecraft, comprising the following steps: providing a structural element which has a core; determining the natural vibration behavior of the structural element; and varying the material density of the core of the structural element, at least in portions, in such a way that the natural vibration behavior of the structural element is optimized. The present invention provides still further an aircraft or spacecraft and a rotor blade, in particular for a wind turbine, comprising such a structural element.

12 Claims, 6 Drawing Sheets

(56) References Cited

U.S. PATENT DOCUMENTS

| | | | |
|---|---|---|---|
| 3,574,484 A | | 4/1971 | Lamb |
| 4,136,846 A | * | 1/1979 | Brault .................. 244/123.6 |
| 4,284,443 A | * | 8/1981 | Hilton ....................... 156/60 |
| 2004/0155148 A1 | | 8/2004 | Folkesson et al. |
| 2005/0018608 A1 | | 1/2005 | Wetherall et al. |
| 2005/0186081 A1 | | 8/2005 | Mohamed |
| 2009/0196763 A1 | * | 8/2009 | Jones et al. ................ 416/90 R |
| 2009/0277996 A1 | * | 11/2009 | Rinaldi et al. ............. 244/123.1 |

FOREIGN PATENT DOCUMENTS

| | | |
|---|---|---|
| DE | 2441325 | 3/1976 |
| DE | 698 05 302 | 11/2002 |
| DE | 102005061751 | 7/2007 |
| WO | 9417303 | 8/1994 |

OTHER PUBLICATIONS

Chinese Office Action, Dec. 16, 2013.

* cited by examiner

STRUCTURAL ELEMENT FOR AN AIRCRAFT OR SPACECRAFT AND METHOD FOR PRODUCING SUCH A STRUCTURAL ELEMENT

CROSS-REFERENCE TO RELATED APPLICATIONS

This application claims the benefit of U.S. Provisional Application No. 61/367,560, filed Jul. 26, 2010 and German patent application No. 10 2010 038 408.9, filed Jul. 26, 2010, the entire disclosures of which are herein incorporated by reference.

FIELD OF THE INVENTION

The present invention relates to a structural element for an aircraft or spacecraft and a method for producing such a structural element.

BACKGROUND OF THE INVENTION

The natural vibration behaviour of structural elements of an aircraft or spacecraft determines the structural dynamic behaviour of the whole aircraft or spacecraft, or at least the affected structural elements. For example, a structural component vibrating at its natural frequency, for example an engine, also induces vibrations in an adjoining structural element, for example an engine casing. The adjoining structural elements which are coupled together excite one another in such a way that undesirable deformations of the structural elements can result therefrom. Furthermore, the natural vibration behaviour of a structural element also determines its so-called aeroelastic behaviour or the aeroelastic behaviour of the whole aircraft or spacecraft. The interaction of the structural element with an air flow is referred to as aeroelastics, and the behaviour of the structural element in the air flow is referred to as aeroelastic behaviour of the structural element. Alongside structural dynamic effects, the structural element is also subjected to elastic deformations caused by air flows. The elastic deformations resulting both from the structural dynamic properties and from the aeroelastic properties of a structural element can, for example, lead to undesirable vibrations in the structural element. This in turn can cause an increased noise development, a partial loss of function of the structural element such as in the case of juddering of a control surface, or even a premature material fatigue.

Various strategies for influencing the vibration behaviour of the structural element are known to the applicant from experience. Additional masses are often fixed to an affected structural element, whereby, for example, the natural vibration frequencies of the structural element can be influenced. With regard to the vibration behaviour of the structural element, this approach does indeed lead to good results. However, the disadvantage then arises that in the case of operating an aircraft or spacecraft, unnecessary i.e. so-called dead or non-structural masses must be moved. This leads inter alia adversely to an increased fuel consumption because of the additional weight.

Alternatively, it is possible to modify the rigidity of the affected structural element in such a way that the natural vibration behaviour is influenced. This can be achieved, for example, by modifying the geometry or topology of the structural element or, in the case of fibre composite constructions, by varying the fibre orientations and/or the fibre layer structure accordingly. Disadvantageously for this approach, however, it has been found that the geometry of the structural element, which is optimised with regard to lightweight construction and aerodynamic behaviour, must be modified. Even modifying the fibre orientation and/or layer structure means an undesirable change with regard to the achievable mechanical properties.

Furthermore, it is possible to use passive or active damper elements. The use of damper elements means, however, an increased number of components in the structural element. This means, disadvantageously, an additional weight and increases, as a further disadvantage, the complexity of the structural element.

DE 698 05 302 T2 describes, for example, a structural element for an aircraft or spacecraft, the rigidity of which can be actively modified to control the vibration behaviour of the structural element. To this end, a cross section of the structural element and thus its rigidity is modified by means of a piezo element integrated in the structural element. The piezo element, which is arranged in a recess of the structural element, is converted for this purpose from an unstretched to a stretched state, whereby the piezo element touches two opposite walls of the recess only in a stretched state and thus transfers forces from one wall to the other wall. The rigidity of the structural element is thus modified and its aeroelastic properties can thus be actively influenced. However, this approach necessitates the use of additional components, meaning, alongside an additional weight, an increased complexity and probability of failure of the structural element, which is an additional disadvantage.

It is therefore one object of the present invention to provide an improved structural element for an aircraft or spacecraft which eliminates the aforementioned disadvantages.

SUMMARY OF THE INVENTION

Accordingly, a structural element for an aircraft or spacecraft is provided with a core, the material density of which varies, at least in portions, in order to optimise the natural vibration behaviour of the structural element.

Furthermore, a method is provided for producing a structural element for an aircraft or spacecraft, comprising the following steps: providing a structural element which has a core; determining the natural vibration behaviour of the structural element; and varying the material density of the core of the structural element, at least in portions, in such a way that the natural vibration behaviour of the structural element is optimised.

The underlying idea of the present invention consists in varying the material density of the core of the structural element, at least in portions. In this way, it is possible to achieve mass concentrations, for example, within the core, by means of which the natural vibration behaviour and therefore the aeroelastic and/or structural dynamic properties of the structural element can be influenced.

Consequently, in contrast with previously described approaches, it is not necessary to use additional weights, or to make changes to the geometry or fibre composite layer structure of the structural element and/or to use additional components in the form of damper elements.

Advantageous embodiments and developments of the present invention emerge from the subclaims and from the description viewed in conjunction with the figures of the drawings.

According to a preferred development of the structural element according to the invention, the structural element has a mass distribution within the structural element by means of the varying material density of the core, in such a way that a predetermined natural vibration frequency of the structural element is ensured in order to optimise the natural vibration behaviour thereof, whereby the aeroelastic and/or structural dynamic properties of the structural element can advantageously be influenced.

According to a further preferred development of the structural element according to the invention, the core of the structural element is constructed as a foam core, solid core, wood core or honeycomb core. This advantageously enables a particularly variable construction of the structural element, whereby its field of application is extended.

According to a further preferred development of the structural element according to the invention, the structural element has a sandwich structure with a cover layer surrounding the core, at least in portions, in particular a cover layer made of carbon fibres. The cover layer advantageously allows an increased rigidity and the desired mechanical properties of the structural element to be achieved. Furthermore, it advantageously enables the introduction of loads into the structural element.

According to a further preferred development of the structural element according to the invention, the core has core segments with differing material density. This enables a simple and convenient variation of the material density of the core, whereby the production costs of the structural element are reduced.

According to a preferred development of the structural element, the core segments are arranged in such a way that the material density of the core varies, at least in portions, whereby a change in the material density of the core is possible by correspondingly selecting core segments with a certain material density.

According to a further preferred development of the structural element according to the invention, the core segments with the differing material density each have a homogeneous material density within themselves. The cores can thus be produced cost-effectively and quickly by means of foam elements which can be bought in.

According to a development of the method according to the invention, the natural vibration behaviour of the structural element is determined by means of a simulation or a vibration test. In this way, the natural vibration behaviour can be quickly and repeatably determined.

According to a further preferred development of the method according to the invention, the core is constructed with core segments which have differing material density. This enables a simple and convenient variation of the material density of the core, whereby the method for producing the structural element is simplified.

BRIEF DESCRIPTION OF THE DRAWINGS

The invention will be explained in more detail below with the help of embodiments with reference to the attached figures of the drawings, in which.

In the figures, the same reference numerals denote components which are the same or have the same function, where nothing is stated to the contrary.

DETAILED DESCRIPTION OF THE INVENTION

Figure 1:
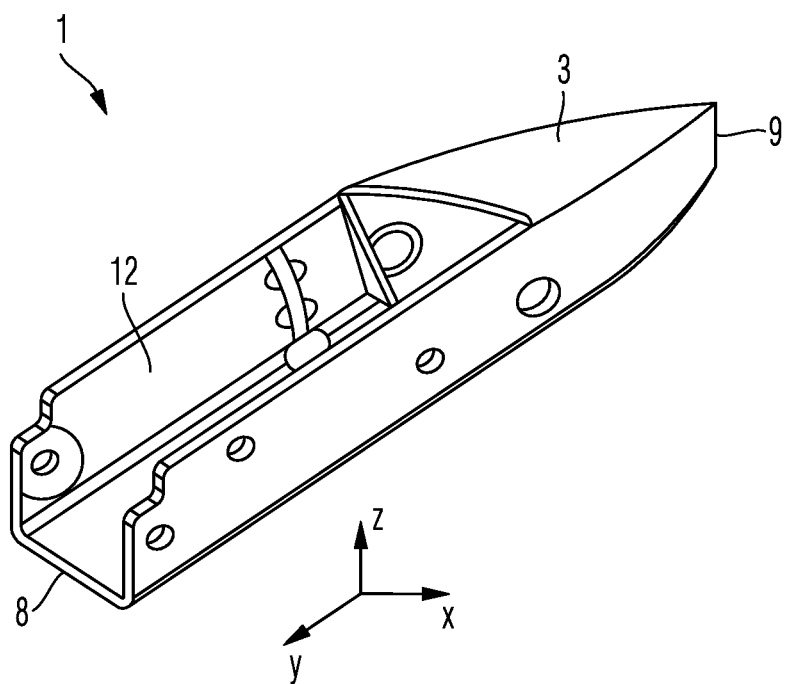
FIG. 1 is a perspective view of a preferred embodiment of a structural element.
Figure 2:
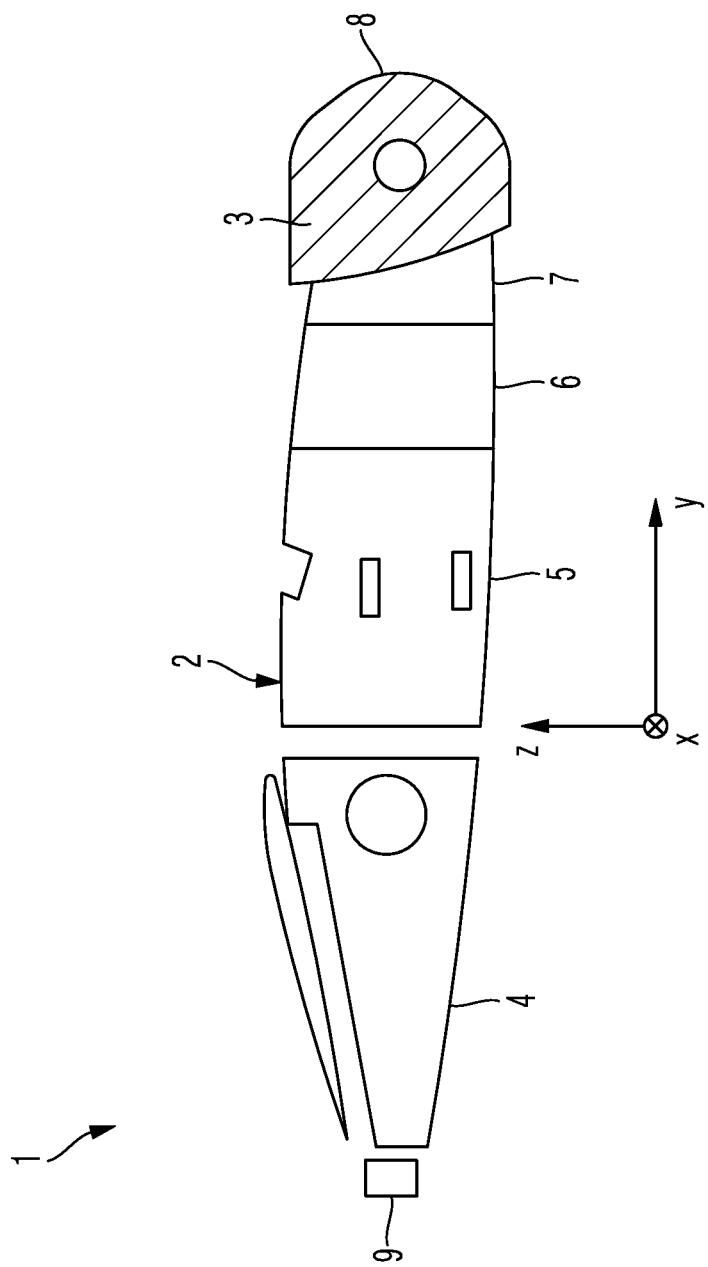
FIG. 2 is a lateral view of a core of the preferred embodiment of the structural element according to FIG. 1.

A preferred embodiment of the present invention is explained with the help of FIGS. 1 and 2, FIG. 1 illustrating a perspective view of a preferred embodiment of a structural element and FIG. 2 illustrating a lateral view of a core of the structural element.

FIG. 1 illustrates a preferred embodiment of a structural element 1 for an aircraft or spacecraft. The structural element 1 is, for example, constructed as a flap fairing 1 or fairing 1. The structural element 1 according to FIG. 1 has an approximately drop-shaped geometry. A seat region 12 of the structural element 1 serves to receive, at least in portions, a landing track (not shown) of an aircraft or spacecraft.

The structural element 1 preferably has a core 2 which is preferably constructed as a foam core 2. For example, the foam core 2 is configured as a closed-cell foam core 2 made of a plastics material. Polymethacrylimide is used, for example, as the plastics material. The core material is characterised, for example, by means of a so-called density of the foam material used for the core 2. This is preferably defined as mass per unit volume, for example, $kg/m^3$. Thus a foam material with a high density has a higher mass fraction and/or volume fraction of plastics material compared with a foam material with a low density per unit volume. The density is also referred to hereinafter as material density of the foam core 2. Alternatively, plastics materials other than polymethacrylimide, metal foams such as, for example, aluminium foams or titanium foams, or a combination of plastics material and metal foams can also be used for the core 2.

A material density or the density of the core 2 varies, at least in portions, in order to optimise the natural vibration behaviour, i.e. the aeroelastic and/or structural dynamic properties of the structural element 1. The material density of the core 2 varies for example in a transverse direction x, a longitudinal direction y and/or a vertical direction z of the structural element 1. A mass distribution within the structural element 1 is configured by means of the varying material density of the core 2 in such a way that, for example, a natural vibration frequency of the structural element 1 is modified in order to optimise the aeroelastic and/or structural dynamic properties of the structural element 1. For example, the mass distribution within the structural element 1 is configured by means of the varying material density of the core 2 in such a way that a natural vibration frequency of the structural element 1 is reduced. The varying material density of the core 2 is preferably achieved by the core 2 having core segments 4-7, whereby the core segments 4-7 preferably have differing material densities or bulk densities. The core segments 4-7 can in turn be subdivided into smaller components which preferably all have the same density. For example, the core segment 4 has three foam components which are shown in FIG. 2 in an exploded view. The core segments 4-7 of differing density are preferably arranged in such a way that the material density of the core 2 within the structural element 1 varies, at least in portions. The number and size of the core segments 4-7 is arbitrary, for example more or fewer than four core segments 4-7 can be provided, thus differing from the embodiment of the core 2 shown in FIG. 2. The core segments 4-7 are preferably arranged in such a way that a natural vibration frequency of the structural element 1 is modified, for example reduced, in a predetermined manner due to the mass distribution in the core 2. For example, compared with a homogeneous core, a lower natural vibration frequency can be achieved by means of the arrangement of the core segments 4-7. Preferably each core segment 4-7 respectively has a homogeneous material density or density within itself. For example, the material density of the core 2 increases continuously from a leading edge 8 to a trailing edge 9 of the structural element 1. To this end, the core segment 7, for example, has a density of 31 kg/m$^3$, the core segment 6 has a density of 51 kg/m$^3$, the core segment 5 has a density of 71 kg/m$^3$ and the core segment 4 has, for example, a density of 110 kg/m$^3$. Thus, according to the present embodiment, a natural frequency of the structural element 1 is reduced, whereby its natural vibration behaviour is influenced, in particular improved. In comparison with a structural element with a core made of a homogeneous foam material with a correspondingly high density which reduces the natural frequency to the same extent, the structural element 1 according to the present embodiment of FIGS. 1 and 2 is considerably lighter. Even in comparison with series solutions with a honeycomb core and additional weight, a considerable reduction in weight is achieved. In addition to the advantage of the reduction in weight, the segmented construction of the core 2 enables a quick and cost-effective production thereof, since the core segments 4-7 can be produced, for example, from semi-finished foam products by means of a CNC machine, according to the requirements. In an alternative embodiment of the structural element 1, the core 2 can, for example, be constructed as a solid core 2, for example as a plastics material core 2, in particular as a solid plastics material core 2, preferably with a plurality of core segments 4-7, which can be made of plastics materials of differing density. Monolithic materials such as, for example, aluminium or titanium alloys can also be used as the material for the solid core 2 or for core segments 4-7 of the core 2. Furthermore, the core 2 can also be constructed as a wood core 2, in particular as a solid wood core 2. The wood core 2 preferably has an arbitrary number of core segments 4-7 which are preferably made of wood materials of differing density such as, for example, poplar or oak wood. In a further embodiment of the structural element 1, the core 2 is constructed as a so-called honeycomb core 2, in particular as a honeycomb core 2 or a folded honeycomb core 2 or the like. The honeycomb core 2 has, for example, core segments 4-7 with differing honeycomb cell densities. Furthermore, the core 2 can be made of a so-called spacer woven fabric or spacer knitted fabric. Moreover, the core 2 is constructed as a tube core 2 or as a core 2 with pimpled honeycombs. Alternatively, the core 2 can be constructed as a so-called 'corrugated core', for example. The core 2 can also be constructed as a ceramic core 2. Individual core segments 4-7 of the core 2 can be made of a ceramic material. In particular, the core 2 can be constructed as a combination of the aforementioned and/or optional core types or core materials, for example as a combined core 2. The combined core 2 comprises, for example, foam material, solid plastics/wood material and/or honeycomb material or the like.

Furthermore, the structural element 1 preferably has a sandwich structure with a cover layer 3 enclosing the core, at least in portions. The cover layer 3 is preferably made of a fibre composite material, in particular of a carbon fibre composite material. The cover layer 3 preferably completely encloses the core 2. For better illustration, in FIG. 2 the cover layer 3, shown hatched, is only shown as covering a portion of the core 2. The cover layer 3 preferably has a low thickness, from fractions of a millimetre up to a few millimetres. The cover layer 3 ensures the required mechanical stability and rigidity of the structural element 1. For example, the cover layer 3 serves to introduce loads into the structural element 1.

In contrast to the continuous changing of the density distribution of the core 2 according to the embodiment of the structural element 1 in FIGS. 1 and 2, the material density of the core 2 can also only be increased in a defined region. If the structural element 1 is, for example, constructed as a wall segment, a core segment with a high density can be provided in a certain region of the wall segment, in order to modify a natural vibration frequency of the wall segment in this region. The further core segments which surround this core segment have, for example, an identical density. It is, however, clear to a person skilled in the art that the core or core segments can be configured as desired to ensure a desired variation in density.

Figure 3:
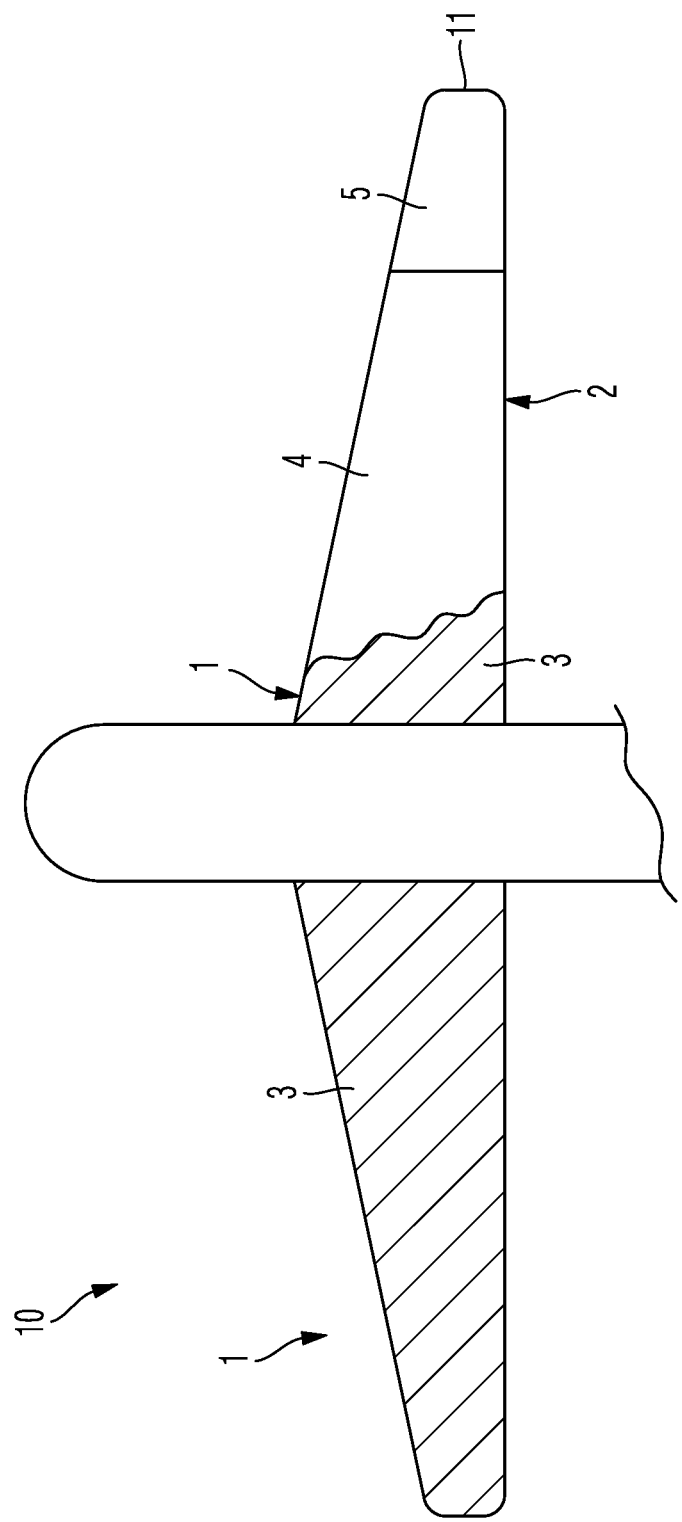
FIG. 3 is a plan view of a further preferred embodiment of a structural element.

FIG. 3 illustrates a further preferred embodiment of a structural element 1 for an aircraft or spacecraft 10, the structural element 1 according to this embodiment being constructed as an aerofoil 1. The cover layer 3 of the structural element 1, shown hatched, is only illustrated in portions. The core 2 of the structural element 1 has, for example, core segments 4, 5, whereby, for example, the core segment 5 which is arranged on a wing tip 11 has a higher, in particular a significantly higher density than the core segment 4. The number and size of the core segments 4, 5 is arbitrary. For example, a plurality of core segments can be provided, whereby the density of the respective core segments increases continuously starting from the core segment 4 to the wing tip 11.

Figure 4:
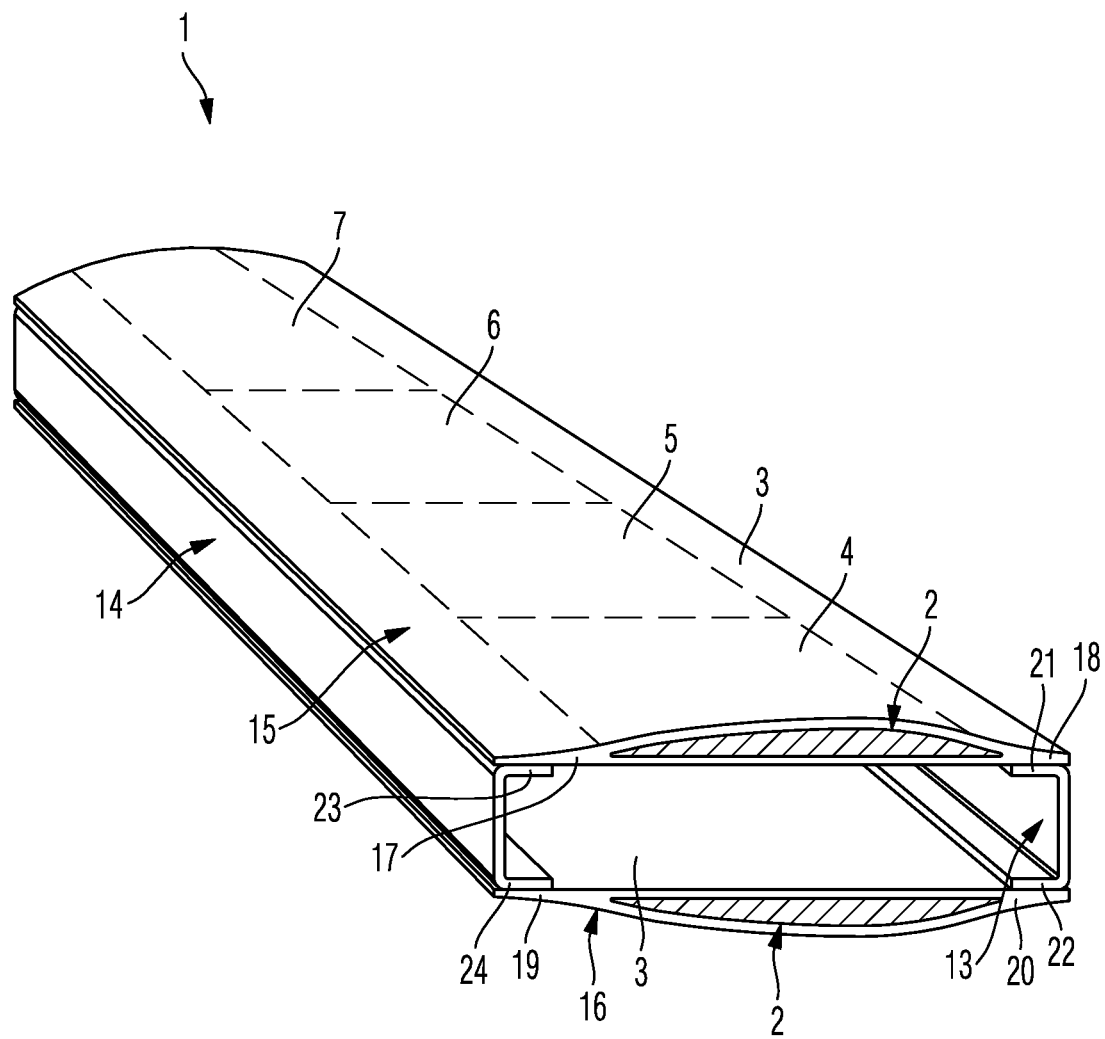
FIG. 4 is a perspective view of a further preferred embodiment of the structural element.

FIG. 4 illustrates a further preferred embodiment of a structural element 1. In order to show this better, the structural element 1 is shown in a perspective partial sectional view. The structural element 1 is, for example, constructed as a spar box or flexural torsion box 1. The spar box 1 forms, for example, an aerofoil 1, a wing box 1 or a tail unit 1, such as, for example, a horizontal tail plane 1, a rudder unit 1, a landing flap 1 or the like, of an aircraft or spacecraft. In this embodiment according to FIG. 4, the structural element 1 has, for example, two spars 13, 14 which are spaced apart from each other and extend in a longitudinal direction of the structural element 1. The spars 13, 14 are preferably made from a carbon fibre reinforced plastics material. The spars 13, 14 are approximately U-shaped in cross-section, whereby planking elements 15, 16 preferably each bear on side arms 21-24 of the respective U-shape. The structural element 1 has, for example, an upper planking element 15 and a lower planking element 16. In the present embodiment, the structural element 1 has two cores 2, whereby a core 2 is assigned to each planking element 15, 16. The cores 2 are segmented as desired according to the embodiments of the structural element 1 in FIGS. 1 to 3 and have, for example, the segments 4-7, shown dashed. The number and arrangement of the segments is arbitrary. The cores 2 are each surrounded, at least in portions, by a cover layer 3 which is preferably made of a carbon fibre reinforced plastics material. The cover layer 3 preferably completely encloses a respective core 2. In the edge regions 17-20 of the planking elements 15, 16 which are assigned to the spars 13, 13 and extend in a longitudinal direction of the structural element 1, the planking elements 15, 16 are connected, for example, to the spars 13, 14. The connection between the spars 13, 14 and the planking elements 15, 16 is carried out, for example, by means of riveting or conglutination. The conglutination can be carried out, for example, by means of a so-called cobonding method. In this case, the uncured planking elements 15, 16 are, for example, connected wet on hard to the spars 13, 14 which have already cured. Preferably the respective core 2 does not extend into the respective edge region 17-20. This means that the edge regions 17-20 and the side arms 21-24 of the spars 13, 14 each preferably form monolithic connection regions. Preferably, the monolithic connection regions are formed as monolithic carbon fibre reinforced connection regions. These merely consist of carbon fibre reinforced plastics material. The embodiment of the structural element 1 according to FIG. 4 is preferably applied in large aircraft such as, for example, passenger aircraft.

Figure 5:
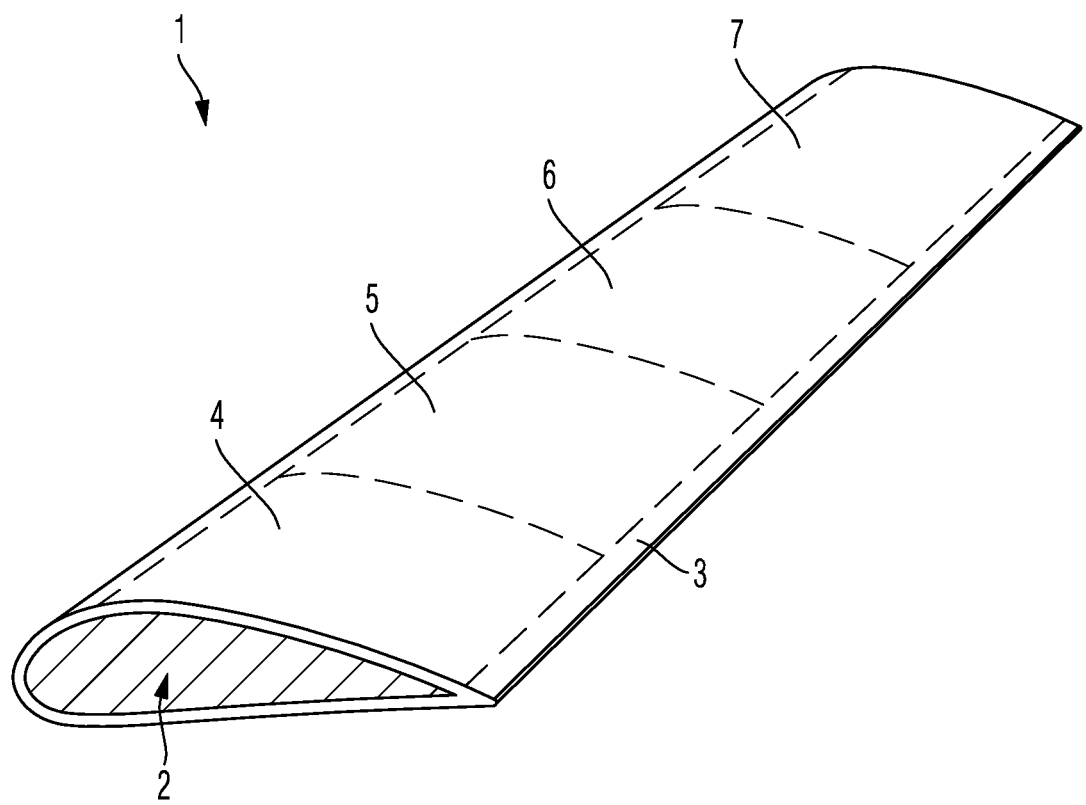
FIG. 5 is a perspective view of a further preferred embodiment of the structural element.

FIG. 5 illustrates a further preferred embodiment of a structural element 1. The structural element 1 is constructed, for example, as an aerofoil 1 of a sailplane, as a propeller blade 1, rotor blade 1 of a helicopter or as a wind turbine blade 1 or rotor blade 1 of a wind turbine. The structural element 1 is constructed in a solid foam sandwich construction, in which the core 2 preferably completely fills an inner region of the structural element 1. An outer contour of the core 2 can approximately correspond to an outer contour of the structural element 1. The core 2 may also, for example, only fill the inner region of the structural element 1 in portions, the cover layer 3 then touching the core 2 preferably not over its entire surface, but rather, for example, only over part of its surface in a linear or punctiform manner. The core 2 is preferably segmented into the segments 4-7, shown dashed, according to the embodiments of the structural element 1 in FIGS. 1 to 4. The number and arrangement of the segments is arbitrary. The cover layer 3 preferably completely encloses the core 2. The cover layer 3 forms an outer skin of the structural element 1. The cover layer 3 is preferably made of a carbon fibre reinforced plastics material. The embodiment of the structural element 1 is applied, for example, in light aircraft. This construction is preferably also applied in propeller blades 1, rotor blades 1 or wind turbine blades 1.

Figure 6:
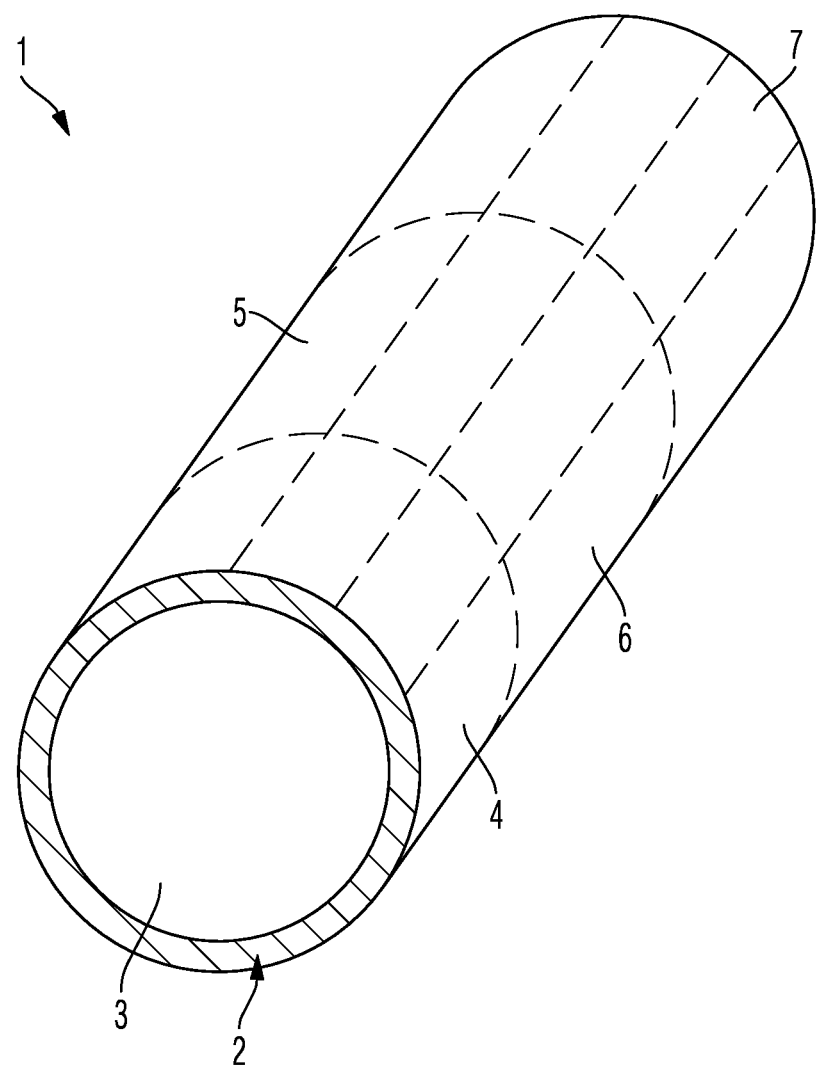
FIG. 6 is a perspective view of yet a further preferred embodiment of the structural element.

FIG. 6 illustrates yet a further preferred embodiment of a structural element 1. The structural element 1 is constructed, for example, as a so-called foam sandwich fuselage 1 for a fuselage airframe of an aircraft, as a fuselage structure 1 of a rail vehicle or as a rocket stage 1. The core 2 which is preferably enclosed by the cover layer 3 is segmented as desired and made from any core materials. The core segments are shown dashed in FIG. 6. For example, segments 4-7 are provided with reference numerals.

The procedure for producing such a structural element 1 of this type for an aircraft or spacecraft 10 is, for example, as follows. To begin with, the structural element 1 is optimised for the respective application with regard to its component weight, its rigidity and its mechanical properties. The natural vibration behaviour of this structural element is then, for example, calculated by means of a simulation or determined by means of a vibration test. Next, the material density of the core 2 of the structural element 1 is varied, at least in portions, in such a way that the structural dynamic and/or aeroelastic properties of the structural element 1 are optimised. To this end, the core 2 preferably comprises the core segments 4-7 which have differing material densities or bulk densities and which are preferably arranged in such a way that the material density of the core 2 varies, at least in portions. The core segments 4-7 are produced, in particular milled, from semifinished foam products, according to the required measurements. The cover layer 3 is finally laminated on the core 2 i.e. the core segments 4-7 are applied to the cover layer 3 which is already cut to size. The impregnation of the cover layer with a matrix material is carried out, for example, by means of a so-called vacuum infusion method.

Although the present invention has been described in full with the help of preferred embodiments, it is not restricted to these but can be modified in a variety of ways. In particular, features of the individual embodiments set out above can be combined with one other as desired, provided this makes technical sense.

For example, the structural element is constructed as a tail unit surface, a control surface or a fuselage segment of an aircraft or spacecraft.

The specified materials, numerical data and dimensions are to be understood as examples and merely serve to explain the embodiments and developments of the present invention.

Of course, an application of the invention is also conceivable in other fields, in particular in vehicle or ship construction.

What is claimed is:

1. A structural element, in particular for an aircraft or spacecraft, comprising a core, the material density of which varies, at least in portions, in order to optimize the natural vibration behavior of the structural element, wherein the structural element has a mass distribution within the structural element by means of the varying material density of the core, in such a way that a predetermined natural vibration frequency of the structural element is ensured in order to optimize the natural vibration behavior thereof.

2. The structural element according to claim 1, wherein the core of the structural element is provided as a foam core, solid core, wood core or honeycomb core.

3. The structural element according to claim 1, wherein the structural element has a sandwich structure comprising a cover layer surrounding the core, at least in portions.

4. The structural element according to claim 3, wherein the cover layer is a cover layer made of carbon fibers.

5. The structural element according to claim 1, wherein the core comprises core segments with differing material density.

6. The structural element according to claim 5, wherein the core segments are arranged in such a way that the material density of the core varies, at least in portions.

7. The structural element according to claim 5, wherein the core segments with the differing material density each have a homogeneous material density within themselves.

8. An aircraft or spacecraft with a structural element according to claim 1.

9. A rotor blade, in particular for a wind turbine, with a structural element according to claim 1.

10. A method for producing a structural element, in particular for an aircraft or spacecraft, comprising the following steps:
providing a structural element which has a core;
determining the natural vibration behavior of the structural element; and
varying the material density of the core of the structural element, at least in portions, in such a way that the natural vibration behavior of the structural element is optimized.

11. The method according to claim 10, wherein the natural vibration behavior of the structural element is determined by means of a simulation or a vibration test.

12. The method according to claim 10, wherein the core is constructed with core segments which have differing material density.

* * * * *